United States Patent [15] 3,687,016
Thomas et al. [45] Aug. 29, 1972

[54] THREADED BODY RAMS
[72] Inventors: Vitas T. Thomas; Robert A. Lovdahl, both of Racine, Wis.
[73] Assignee: Tomco, Inc., Racine, Wis.
[22] Filed: May 18, 1970
[21] Appl. No.: 37,475

Related U.S. Application Data
[63] Continuation of Ser. No. 719,356, April 8, 1968, abandoned.

[52] U.S. Cl. ..................92/130, 92/164, 269/25
[51] Int. Cl................................................F01b 30/00
[58] Field of Search .....92/164, 130, 128; 269/25, 26

[56] References Cited
UNITED STATES PATENTS
2,916,883 12/1959 Geck........................269/26 X
3,226,078 12/1965 Anderson..................92/164 X
3,113,490 12/1963 Weaver.....................92/164 X
3,420,148 1/1969 Doerfer et al. ..............92/164
2,916,883 12/1959 Geck........................269/26 X Primary Examiner—Martin P. Schwadron
Assistant Examiner—Leslie J. Payne
Attorney—Ronald E. Barry and James E. Nilles

[57] ABSTRACT
Disclosed herein is a work holding assembly including a hydraulic device having a threaded cylindrical housing which is adapted to be supported for axial adjustment in a threaded aperture in a mounting bracket and a ram mounted for reciprocal motion in the housing and retained therein by an integral part of the housing and a bushing mounted on the housing with a single O-ring to seal the connection between the bushing and the housing and the connection for the fluid flow passage through the bushing and into the housing.

1 Claim, 5 Drawing Figures

Patented Aug. 29, 1972
3,687,016
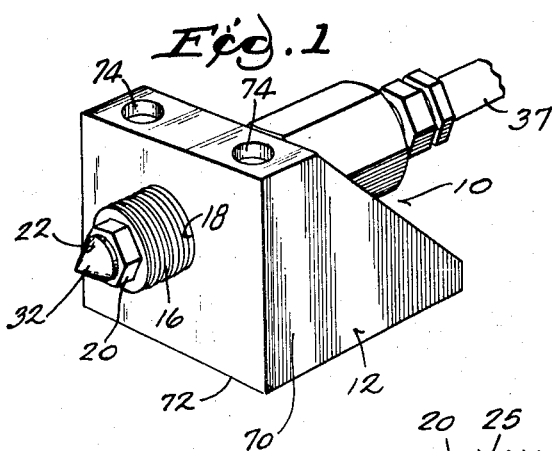
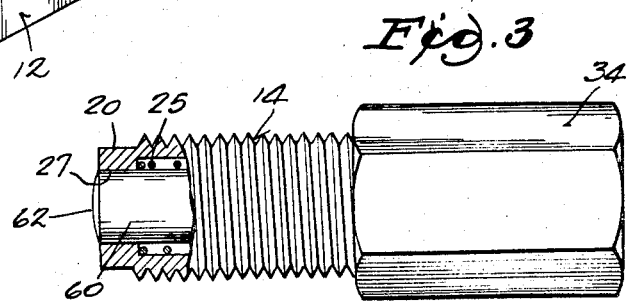
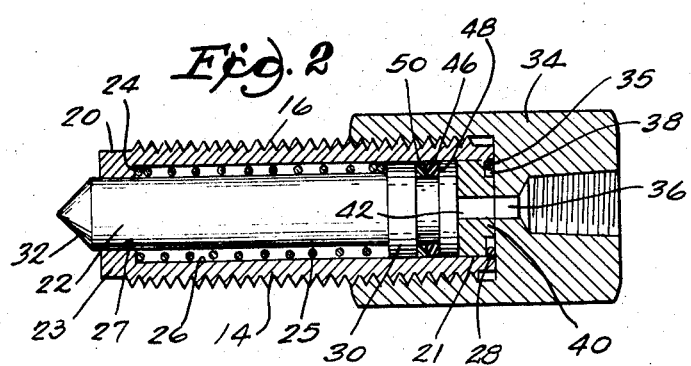
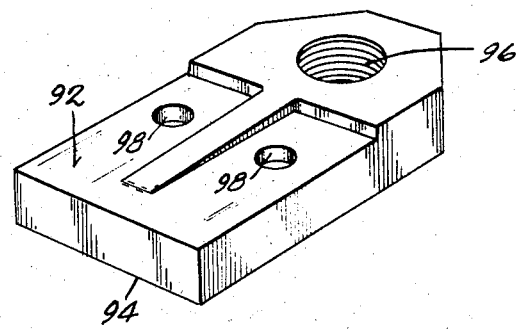
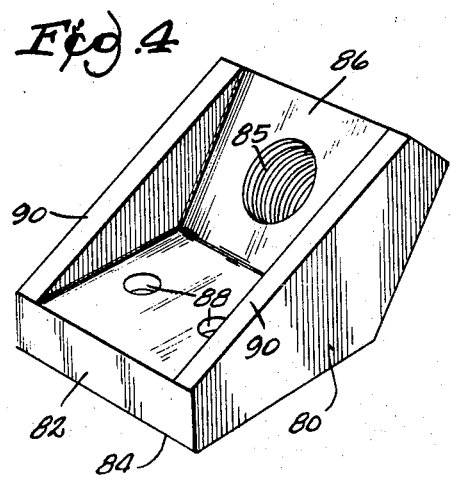
INVENTORS
VITAS T. THOMAS
ROBERT A. LOVDAHL
BY Wheeler, Wheeler, House & Clemency
ATTORNEYS

THREADED BODY RAMS

This application is a continuation of Ser. No. 719,356, filed Apr. 8, 1968, now abandoned.

BACKGROUND OF THE INVENTION

In work holding assemblies of the type contemplated herein a hydraulic device having a reciprocally moveable ram is used to hold a work piece in a fixed position during a machining operation. A snap ring has been used to retain the ram within the housing against the hydraulic force which is used to operate the ram. If the snap ring breaks, the ram is discharged from the housing by the force of the high pressure hydraulic fluid in the housing. Since this force often is in the order of 5,000 psi, the ram is discharged at great speed creating a dangerous working condition.

SUMMARY OF THE INVENTION

The invention disclosed herein provides a work holding assembly formed from a number of interchangeable components which can be readily assembled to accommodate various sizes and shapes of work pieces. Specifically, the work holding assembly includes a hydraulic device having a threaded cylindrical housing which can be mounted for axial adjustment within threaded apertures in various angularly disposed mounting brackets. A ram is mounted for reciprocal motion in a bore in the housing with a permanent shoulder or flange provided at the end of the bore of the housing to prevent discharge of the ram from the housing. A bushing is used to close the other end of the bore and is so arranged that a single seal can be used to seal both the fluid flow passages into the bore and the bushing on the housing.

Other objects and advantages of the present invention will become more readily apparent when read in connection with the accompanying drawings in which:

FIG. 1 is a perspective view of the hydraulic ram mounted in a horizontal mounting bracket.

FIG. 2 is a side view in section of the hydraulic ram with a pointed ram.

FIG. 3 is a side view partly in section of the hydraulic ram with a crown on the end of the ram.

FIG. 4 is a perspective view of a 45° angle mounting blade.

FIG. 5 is a perspective view of a vertical mounting block.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The work holding assembly shown in the drawings includes a hydraulic device 10 supported by means of a mounting bracket 12 for axial adjustment relative to a work piece (not shown). More particularly, the hydraulic device 10 includes a cylindrical housing 14 having a threaded outer section 16 positioned within a threaded aperture 18 in the mounting bracket 12. Axial adjustment of the hydraulic device 10 in the bracket 12 is achieved by merely turning the housing 14 in one direction or the other in the threaded aperture 18. A hexagonal nut 20 is formed as an integral part of the housing 14 on the end of the threaded section 16 to aid in adjusting the hydraulic ram in the bracket.

A solid ram 22 is mounted within housing 14 and is prevented from being discharged from the housing 14 by means of a permanent shoulder or flange 24 formed as an integral part of the housing 14. In this last regard, the housing 14 has a central bore 26 with the shoulder or flange 24 provided at the end 23 of the bore 26 and a tapered section 28 provided at the end 21 of the bore 26. The solid ram 22 includes a piston head 30 which is inserted into the bore 26 through tapered section 28 with the end 32 of the ram projecting outward through an aperture 27 formed by the shoulder or flange 24 at the end of the housing. The outer diameter of the piston head 30 is greater than the internal diameter of the aperture 27 formed by the shoulder 24 and therefore the ram cannot be discharged through the end 23 of the bore 26.

The open end of the bore 26 in the housing 14 may be closed by various means which can be screwed onto the housing and include a fluid flow path. In the disclosed embodiment, a cap nut 34 having a fluid inlet passage 36 is mounted on the end 21 of the housing 14 to close the open end of the bore 26. The ram 22 is moved in the bore 26 by admitting hydraulic fluid under pressure from a source (not shown) through a pressure line 37 connected to the inlet passage 36 into bore 26 to move the ram 22 toward the end 23 of the housing 14 (FIG. 2), and a return spring 25 is provided between the shoulder 24 and piston head 30 to move the ram 22 toward the end 21 of the housing (FIG. 2). When high pressure fluid is admitted into the bore 26 of the housing 14 against the piston head 30, the end 32 of the ram 22 will be forced outwardly through the aperture 27 in shoulder 24 with the piston head 30 compressing the spring 25 against shoulder 24.

Various means may be employed to seal the cap nut 34 on the housing 14 and in the disclosed embodiment the seal is provided by an 0-ring 35 positioned in a recess 38 in the face of a retainer ring 40 press fitted into the bore 26 through the tapered section 28. The retainer ring 40 will be located between the piston head 30 and the cap nut 34 and has an inlet opening 42 aligned with the inlet passage 36 in the cap nut 34. The 0-ring 35 has an outer diameter slightly larger than the diameter of the bore 26 so that the 0-ring seats on the tapered section 28 a the end 21 of the bore 26. When the cap nut 34 is screwed onto the housing to close the end of the bore 26, the 0-ring 35 will be squeezed between the bushing and the retainer ring. It should be noted that the O-ring 35 will provide a dual seal effect, sealing the connection of the cap nut with the housing 14 as well as the connection between the inlet passage 36 in the bushing and the inlet opening 42 in the ring 40.

The piston head 30 is sealed within the bore 26 by an 0-ring 46 provided in a groove 48 on the outer periphery of the piston head 30. Extrusion of the 0-ring 46 between the piston head 30 and bore 26 is prevented by a backup ring 50 located in the groove 48 on the low pressure side of 0-ring 46. The backup ring 50 is made of a plastic material such as Teflon (tetrafluorethylene). The backup ring 50 is required only on the low pressure side of the 0-ring 46 since the high pressure fluid on the high pressure side of the 0-ring 46 will prevent the 0-ring from being extruded in the space between the piston head 30 and the bore 26.

Where it is desirable to secure the work piece in position by means other than a sharp point on end 32 of the ram 22, an alternate arrangement is provided as shown in FIG. 3. In this hydraulic ram, a solid ram 60 is mounted for reciprocal motion in housing 14 and has a crown on end 62 of ram 60 projecting through the aperture 27 in the flange or shoulder 24. All of the other parts of this hydraulic ram and its operation are the same as disclosed for FIG. 2.

Various mounting means can be used to support the hydraulic ram depending on what angular relationship is required for the work piece. In FIG. 1 the mounting bracket 12 shown includes a main block or body 70 having a mounting surface or base 72 with the threaded aperture 14 extending parallel to the mounting surface. Mounting holes 74 are provided on each side of the aperture for mounting bolts (not shown). In FIG. 4 a 45° mounting bracket 80 is shown having a main plate 82 with a mounting surface or base 84. A support arm 86 is mounted at a 45° angle to the plane of the base 84 with a threaded aperture 85 having its axis at a 45 degree angle to the base 84 and mounting holes 88 provided for mounting bolts (not shown). Fillets 90 may be provided between the support arm 86 and plate 82. In FIG. 5 another form of mounting bracket 92 is shown having a base 94 with threaded aperture 96 having its axis perpendicular to the plane of the base 94. Mounting holes 98 are provided in the base for mounting bolts (not shown).

The hydraulic ram is assembled by inserting the spring 25 in the bore 26 of the housing 14 in abutting engagement with the shoulder or flange 24. The ram 22 is inserted into the bore 26 of the housing 12 through the spring 25 until the pointed end 32 of the ram extends through the shoulder 24 with the spring abutting the piston head 30. The inlet ring 40 is press fitted into the end of the bore 26 and the 0-ring seal 35 placed in the recess 38 provided on the face of the ring 40. The cap nut 34 is tightened onto the end of the housing 14 to squeeze the 0-ring 35 in the space between the cap nut 34 and the retainer ring 40 into sealing engagement with the tapered section 28 at the end of the bore 26 to seal the connection between passage 36 and opening 42 and the connection of the cap nut 34 with the housing 14 and the bore 26.

We claim:
1. A hydraulic device comprising:
a housing having an axial bore, and a threaded section on the outer periphery of said housing,
a shoulder extending radially inwardly at one end of said bore, a tapered section at the other end of said bore, and a hexagonal nut formed as an integral part of the end of said housing adjacent said shoulder,
a ram having a piston head mounted for reciprocal motion within said bore, and
a spring positioned between said shoulder and piston head for biasing said ram away from said shoulder,
a retainer ring positioned in the other end of said bore and having an outer diameter equal to the diameter of said bore to provide a press fit between said retainer ring and said tapered section of said bore when said retainer ring is flush with the end of said housing, an annular recess in one face of said retainer ring and a fluid inlet opening through said retainer ring connected to said bore,
a single 0-ring seal positioned in said recess and having an outer diameter greater than said retainer ring to provide a seal with said tapered section and a ring diameter greater than the depth of said recess and a cap nut mounted on said threaded section in sealing engagement with said 0-ring seal.

* * * * *